United States Patent [19]

Face et al.

[11] Patent Number: 4,974,192
[45] Date of Patent: Nov. 27, 1990

[54] COMMUNICATION PROCESSOR FOR PERSONAL COMPUTER

[75] Inventors: William W. Face; Richard G. Barnich, both of Saline, Mich.

[73] Assignee: Face Technologies, Inc., Saline, Mich.

[21] Appl. No.: 391,625

[22] Filed: Aug. 4, 1989

Related U.S. Application Data

[63] Continuation of Ser. No. 76,945, Jul. 23, 1987, abandoned.

[51] Int. Cl.$^5$ .......................... G06F 15/74; G06F 9/02
[52] U.S. Cl. ..................................... 364/900; 364/927; 364/929.4; 364/929.5; 364/929.61; 364/940
[58] Field of Search ... 364/200 MS File, 900 MS File

[56] References Cited

U.S. PATENT DOCUMENTS

| | | | |
|---|---|---|---|
| 4,575,793 | 3/1986 | Morel et al. | 364/200 |
| 4,641,262 | 2/1987 | Bryan et al. | 364/900 |
| 4,683,550 | 7/1987 | Jindrick et al. | 364/900 |
| 4,748,656 | 5/1988 | Gibbs et al. | 379/93 |
| 4,878,196 | 10/1989 | Rose | 364/900 |

OTHER PUBLICATIONS

KAYPRO Professional Computer User's Guide, Kaypro Corporation, May 1986, chapter 13, pp. 2-10.

*Primary Examiner*—Eddie P. Chan
*Assistant Examiner*—Christine M. Eakman
*Attorney, Agent, or Firm*—Krass & Young

[57] ABSTRACT

A microcomputer is adapted to act as a communications processor for a personal computer of the type having its address and data busses supplied to a female connector forming part of a system expansion slot. The communications processor is formed on a printed circuit card and includes at least two I/O ports, one connected to its edge connector for insertion into the slot connector of the personal computer, and the other formed on its rear edge so as to be accessible to external connectors. The communications processor has a power supply energized through a connector on its rear edge and a back-up battery power supply. The communication processor can receive communications from and transmit to remote sources while the personal computer is being used for other purposes. Receiver messages are stored in the RAM of the communications processor and are unloaded to the personal computer under control of its keyboard at the operator's convenience. Messages to be transmitted may also be loaded into the communication processor's RAM from the personal computer along with instructions causing them to be transmitted at any convenient time, whether or not the personal computer is then energized or in alternate use.

19 Claims, 2 Drawing Sheets

COMMUNICATION PROCESSOR FOR PERSONAL COMMPUTER

This a continuation of co-pending application Ser. No. 07/076,945, filed on July 23, 1987, now abandoned.

FIELD OF THE INVENTION

This invention relates to electronic digital computers of the personal computer type and more particularly to a microcomputer formed on a single board adapted to act as an input/output communication processor for a personal computer and to connect to that personal computer through the computer's data and address bus.

BACKGROUND OF THE INVENTION

Digital computers employing microprocessors as their central processing unit are commonly employed as what are termed "personal computers" or "engineering work stations." These self-contained devices will hereinafter be generically referred to as "personal computers." In addition to their central processing units, formed on a single integrated circuit chip, they include semiconductor random access memory, semiconductor read only memory for storing their operating system, some form of mass memory, usually in magnetic form, a keyboard for introducing user-operated commands, and a self-contained power supply.

In a popular form of personal computer, modeled after the IBM PC line, these circuits are all formed on or interconnected to a single large printed circuit board, termed the "mother board". The mother board includes female connectors of the type adapted to receive edge connectors formed on printed circuit boards, termed the "system expansion slot," which are electrically interconnected to the address and data bus of the personal computer. Through use of the system's expansion slot and associated mechanical elements within the housing for the personal computer, the personal computer may be expanded by adding printed circuit boards containing specialized electronic circuits so that they interconnect directly with the personal computer.

Personal computers are used for two broad purposes: self-contained processing of data, including text, and communication with remote data sources and sinks. Some personal computers are dedicated solely to self-contained processing activities such as accounting functions or word processing using text introduced by a keyboard or magnetic disks, and require no communication with remote stations. Other personal computers are used for communications such as electronic mail terminals, data collection devices, terminals for remote computers or data bases, and the like. Often a personal computer will be dedicated to one of these tasks but in other situations such dedication is not economical and it is preferable for a personal computer to perform a variety of mixed local processing and communication tasks often on an overlapping time basis.

Without the use of highly specialized software, a personal computer that is used to receive communications that occur on a nonpredictable time schedule, cannot be used simultaneously for local processing tasks. Rather, the computer must be dedicated to the receiving operation so that it is always in the proper status to receive communications. Since many communication operations utilize only a small fraction of the receiver's time, this is often a uneconomic commitment of computer resources.

SUMMARY OF THE INVENTION

The present invention is accordingly directed to an attachment for a personal computer that enables the computer to receive and transfer files automatically, while at the same time performing other local processing tasks. The attachment has its own power source so that files can be transferred even while power to the personal computer is turned off.

The preferred embodiment of the invention, which will subsequently be disclosed in detail, takes the form of a printed circuit board configured to be insertable into a system expansion slot of the personal computer. The board supports, and circuit lines imprinted on the board interconnect, electronic components forming a microcomputer. These include an integrated circuit microprocessor chip, semiconductor dynamic random access memory, and semi-conductor read only memory encoded with an operating system program for the communications processor. The card also supports a line powered power supply connected to a line cord through an end connector on the board. A battery on the board provides back-up power for the memory in the event of line power failure.

At least two and preferably three input/output ports are provided on the communications processor board. One connects the communications processor computer to the address/data bus of the host personal computer via an edge connector formed on the board which plugs into the system expansion slot of the host computer. The second input/output port connects the communication processor to the outside world via an end connector on the board. The end connection may be used to couple the communications processor to the telephone system or networks via a modem, or may provide a direct wired connection to other data sources and/or sinks.

A third input/output port may alternatively be formed on the communications processor board and provided to another end connector. Under the control of appropriate signals from the host computer the communication processor can switch this auxiliary input/output port directly to the data/address bus of the host.

In use, the communication processor acts under the control of the host computer. Application programs for the communication processor are preferably stored on diskettes or the like useful with the mass memory of the host personal computer and are loaded into the random access memory of the communication processor. These programs allow any program, file or document stored in the personal computer to be transferred to the RAM memory of the communications processor. Commands entered via the host keyboard can cause these files to be transmitted automatically or at a preprogrammed later time even if the personal computer is performing other processing tasks at that time or is de-energized. The communication processor may also be placed in a stand-by mode by appropriate commands from the personal computer wherein files can be received from external data sources at any time, independent of the status of the personal computer at that time. The received files may be then transferred to the host.

The communications processor generates signals which are provided to the personal computer host indicating its memory capacity, files received, or operation condition.

DESCRIPTION OF THE DRAWINGS

Other objectives, advantages and applications of the invention will be made apparent by the following detailed description of a preferred embodiment of the invention. The description makes reference to the accompanying drawings in which.

DETAILED DESCRIPTION OF THE PREFERRED EMBODIMENT OF THE INVENTION

Figure 1:
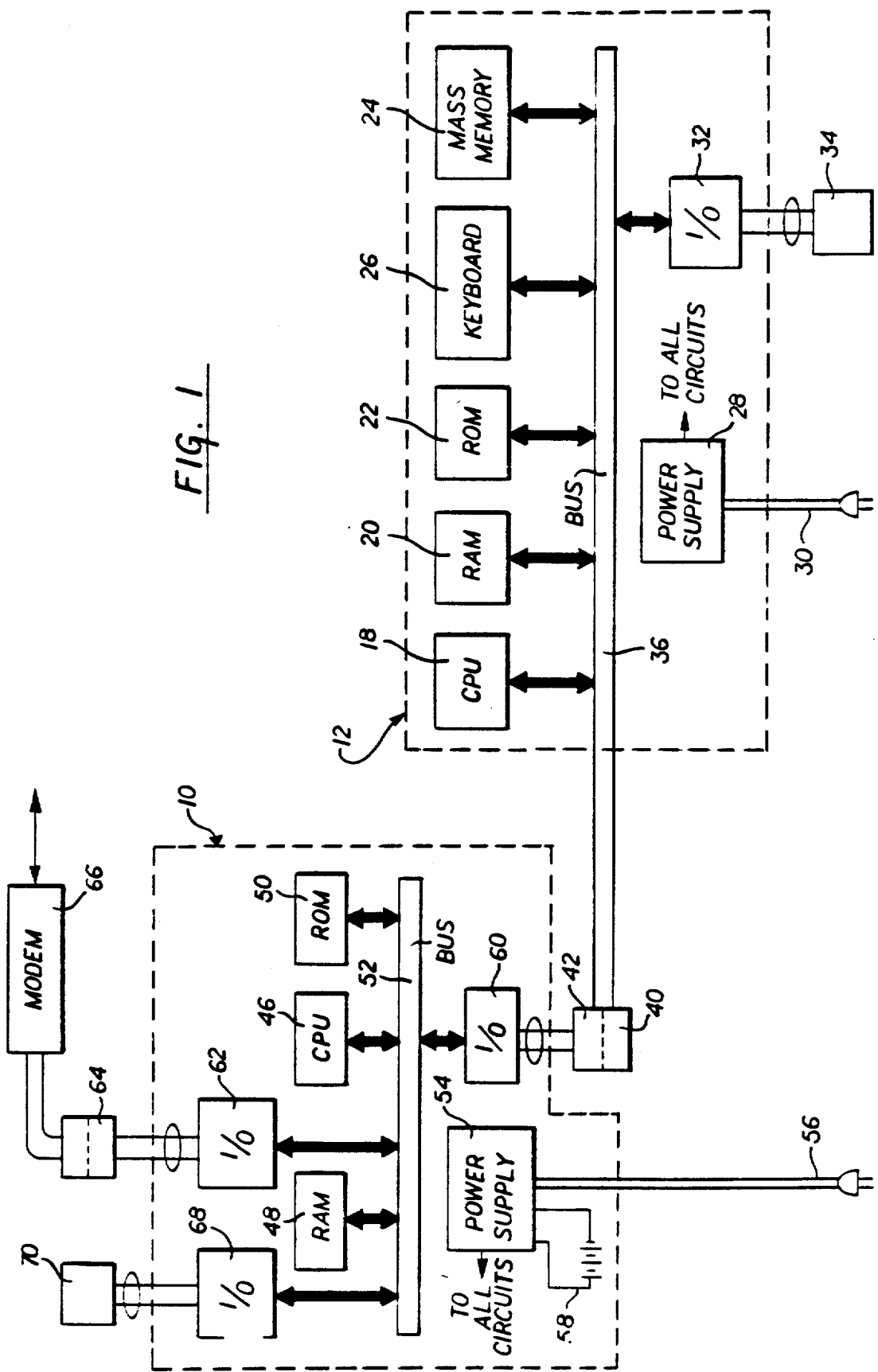
FIG. 1 is a schematic drawing of a communications processor formed in accordance with the present invention and of a host personal computer interconnected to the processor.

Referring to the drawings, the preferred embodiment of the invention takes the form of a communication processor, generally indicated at 10 in FIG. 1, used in connection with a personal computer, generally indicated at 12 in FIG. 1. The communications processor 10 is formed on a printed circuit board 14, illustrated in FIG. 2 as being interconnected in a system expansion slot of the personal computer 12, the pertinent section of which, in the vicinity of the system expansion slot, is generally indicated at 16 in FIG. 2.

The personal computer 12 has a conventional electronic architecture of the Von Neumann variety. It employs a central processing unit 18 taking the form of an integrated circuit microprocessor. A random access memory 20 is conventionally formed by integrated circuit chips. An electronically programmed read only memory 22 permanently encodes pertinent portions of the operating system for the personal computer 12. A mass memory 24, typically taking the format one or more floppy disk drives and/or a hard disk drive, forms part of the system. The operator control signals for the system as well as data input may be provided by a keyboard 26. A power supply 28, energized from an appropriate alternating current line supply through a line cord 30 interconnects and provides power to all of the circuits. An input/output port (I/0 port) 32 enables communication with external devices via a connector 34.

All of the digital subsystems of the personal computer are interconnected by an address/data bus 36 which also provides means for connecting various options and peripheral subsystems to the personal computer.

Figure 2:
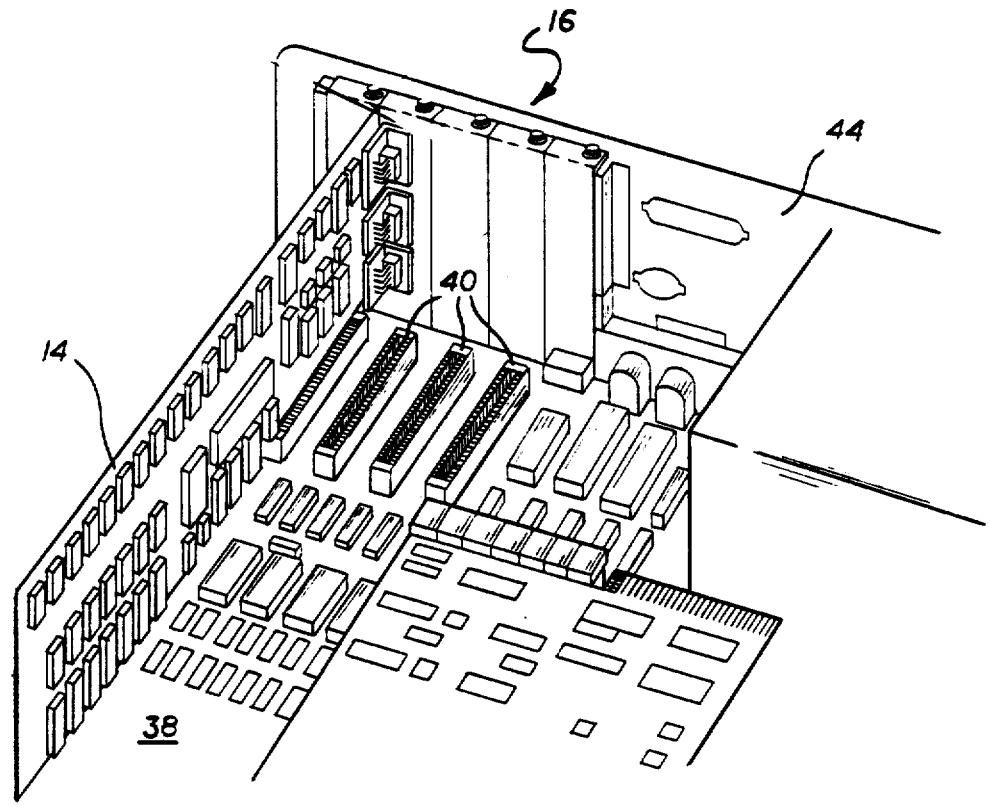
FIG. 2 is a partial perspective view of a printed circuit board containing a communications processor of the present invention, interconnected in a system expansion slot of a host personal computer.

The physical arrangement of the components of the personal computer 12 is preferably of the type made popular by the IBM PC series. A pertinent portion of the physical arrangement of this type of system as illustrated in FIG. 2. The electronic components or connectors for them are physically supported on a large printed circuit board 38, termed the mother board. These components include a number of female connectors 40 which make electrical connection to the address/data bus 36 of the personal computer. The connectors 40 are used to electrically interconnect and mechanically support optional electronic subsystems to be added to the basic personal computer such as the communication processor 14 of the present invention. The connectors are adapted to receive male edge connectors 42 formed on one long edge of the rectangular printed circuit cards such as 14, to be interconnected to the system. When the edge connectors are inserted in the system expansion slot connectors 40 of the personal computer, one of the short ends of their cards extend along holes formed in the rear panel 44 of the personal computer housing so that electrical connectors formed on that edge of the printed circuit board are accessible from the rear of the personal computer.

The components of the communication processor 10 include the integrated circuit microprocessor CPU 46, a dynamic random access memory, 48, preferably providing 256 K words, and an electronically programmable read only memory 50 encoded with pertinent portions of the operating system for the communications processor. These electronic subsystems are interconnected by an address/data bus 52.

An independent power supply 54 for the communications processor is provided on the printed circuit board 14. The power supply derives electrical power from an AC line via a line cord 56 which may be connected to the system through an end connector on the board 14. The board also supports a memory back up battery 58, preferably of a rechargable variety such as a nickel cadmium battery. The battery 58 is capable of supplying operating power to the communication processor for short periods of time and to protect the memory for a longer period, such as eight hours. Circuitry on the board automatically switches in the battery back-up when the communications processor is turned on by appropriate control signals introduced from the personal computer and no power is received via the line cord 56.

The communication processor, 10 includes a first I/0 circuit 60 electrically connected via the edge connector 42 to the socket 40 of the personal computer bus 36 and to the bus 52. A second I/0 circuit 62 connects to the bus 52 of the communication processor and to an electrical connector 64 formed on the rear edge of the printed circuit card 14. This port is adapted to be connected to remote communication sources and sinks, such as other computers, process sensors and the like, via appropriate communication links. A modem 66, which may be used to connect the system to a phone line or other broad band network is illustrated in FIG. 1. In other embodiments of the invention the modem could be formed as part of the communication processor on the printed circuit board 14.

The communication processor preferably includes a third I/0 circuit 68, joined to a connector 70 formed on the rear edge of the printed circuit card 14. This third I/0 port could be used to provide communications directly to and from the personal computer 12. Appropriate control signals provided to the communication processor switch the port 68 to the personal computer bus 36 via the communication processor bus 52.

In use, application programs for the communication processor 10 are provided to the personal computer through the mass memory 24, preferably in the form of signals on diskettes. The personal computer stores portions of these programs in its RAM 20 and loads other portions of these programs into the RAM 48 of the communication processor. These preferably include a file management program and an automatic file transfer program. The file management program assigns file numbers, dates and times whenever files are stored in the memory of the communication processor. It also coordinates the routine housekeeping of erasing files and allocating memory. The automatic file transfer program handles all the transfers of files in and out of memory. It also supplies the communication protocol between the input/output port 62 and the modem 66. These application programs only occupy a small fraction of the random access memory 48, leaving the bulk of the memory available for the storage of files, either provided by the personal computer 12 for transmission to remote devices, or files received from remote devices for later provision to the personal computer.

Under control of appropriate commands introduced to the personal computer through the keyboard 12, a file stored in the personal computer on the mass memory 24 or the RAM 20 can be transferred to the RAM 48 of the communication processor. Appropriate control signals will enable either the immediate transmission of that file to a remote receiver via the input/output port 62, or, alternatively, such transmission at a later time encoded in the control signals. The time can be selected to synchronize the transmission with the availability of a receiver, or to obtain low-cost data transmission rates available at off hours.

Commands from the keyboard 26 can also place the communication processer 10 in a stand-by mode in which the processor is ready to receive files from remote data sources automatically, independently of whether the personal computer is being used for other purposes or is even de-energized. Once a file is received, a file number is assigned along with the time and date received. If the available memory space is too small for the received file the communication processor 10 will reject the file but will record the attempted communication in its memory.

It is therefore seen that the communication processor enables an associated personal computer to perform a plurality of tasks simultaneously at a substantially lower cost than would be required to provide two independent personal computers.

Having thus described my invention I claim:

1. A communications processor for use with a personal computer having address and data busses connected to a female connector to receive a male edge connector formed on said communications processor comprising:
   a rectangular printed circuit board having said male edge connector formed on one of its long edges for mating with the female connector of the personal computer;
   a line cord having a first end for connection to an AC electric power line and a second end connected to said printed circuit board;
   electronic components supported on the printed circuit board and interconnected with one another by conductors formed on the printed circuit board to form a microcomputer, said components including an address/data bus, a microprocessor connected to said address/data bus, a random access memory connected to said address/data bus, a read only memory connected to said address/data bus, a line-powered power supply connected to said line cord, said microprocessor, said random access memory and said read only memory for powering said microcomputer via the AC electric power line and a battery operated power supply connected to said microprocessor, said random access memory, said read only memory and said line-powered supply for powering said microcomputer upon failure of the AC electric power line;
   a second connector formed on a short edge of the printed circuit board;
   electronic components forming two I/O ports supported on the printed circuit board and interconnected by conductors formed on the printed circuit board, the first of the I/O ports being connected to said male edge connector and to said address/data bus, and the second of the I/O ports being connected to said address/data bus and to said second connector;
   wherein said communications processor receives commands from the personal computer via said first I/O port from said male edge connector, said communications processor further including:
   means responsive to a first command for controlling said communications processor to
      receive data via said first I/O port from said male edge connector,
      store said received data in a file within said random access memory, and
      initiate communication via said second I/O port and transmit data stored in said file within said random access memory via said second I/O port to said second connector independent of whether the personal computer is performing other tasks or is de-energized,
   means responsive to a second command for controlling said communications processor to transmit data stored in an identified file within said random access memory via said first I/O port to said male edge connector, and
   means responsive to a third command for controlling said communications processor to enter a standby mode independent of whether the personal computer is performing other tasks or is de-energized to
      respond to communication initiated via said second I/O port from said second connector,
      receive data via said second I/O port from said second connector, and
      store said received data in a file within said random access memory.

2. The communication processor of claim 1 further including electronic components supported on and interconnected by conductors on said printed circuit board to form a third I/O port connected to said microcomputer by said address/data bus, and a third connector supported on said short edge of said printed circuit card, interconnected with said third I/O port.

3. The communication processor of claim 1 further including an operating program for the microprocessor stored in said read only memory.

4. The communication processor of claim 3 including application program for the communication processor to be stored in part in random access memory on said personal computer and in part in said random access memory of said communication processor, adapted to allow the personal computer, under the control of input commands from a keyboard or other suitable personal computer input means, to transmit said commands to said communication processor and to allow said communication processor to be responsive to said commands.

5. The communication processor of claim 1 wherein said personal computer is of the type having a mother board supporting said female connector to receive said printed circuit board male edge connector, and having a housing enclosing said mother board, and wherein said printed circuit board of said communication processor has such dimensions that when said male edge connector is supported within the female connector of the personal computer, a first edge of said printed circuit board abuts an opening formed in said housing so that said second connector is available through an aperture formed in the housing.

6. The communications processor of claim 1 wherein: said communications processor immediately initiates communication and transmits data stored in said file upon receipt of said first command.

7. The communications processor of claim 1 wherein: said communications processor initiates communication and transmits data stored in said file at a commanded later time upon receipt of said first command.

8. The communications processor of claim 1 wherein: said communications processor refuses communication initiated via said second I/O port from said second connector and records an attempted communication if the length of received data is greater than the available space within said random access memory when in said standby mode.

9. An electronic, digital computer system comprising:
a first computer including:
   a first CPU,
   a first random access memory,
   a first read only memory,
   a secondary mass storage memory,
   a keyboard,
   all of said elements being interconnected by a first address and data bus,
   a first line-powered power supply connected to said first CPU, said first random access memory, said first read only memory, said secondary mass storage memory, and said keyboard for connection to an AC electric power line, said first line-powered power supply for powering said first computer via the AC electric power line; and a second computer comprising:
   a second CPU,
   a second random access memory,
   a second read only memory,
   at least first and second input/output ports, all of said elements being interconnected by a second address and data bus,
   a second line-powered power supply connected to said second CPU, said second random access memory, and said second read only memory for connection to an AC electric power line separate from the connection of said first line-powered power supply, said second line-powered power supply for powering said second computer via the AC electric power line; and
   electrical interconnections between said first input/output port of the second computer and said first address and data bus of the first computer, and electrical interconnections between said second input/output port of the second computer and an outside data source, wherein the second computer receives commands via said first input/output port and said first address and data bus from the first computer, said including second computer further:
   means responsive to a first command for controlling the second computer to
      receive data via said first input/output port from the first computer,
      store said received data in a file within said second random access memory, and
      initiate communication via said second input/output port and transmit data stored in said file within said random access memory via said second input/output port to the outside data source independent of whether said first computer is performing other tasks or is deenergized,
   means responsive to a second command for controlling the second computer to transmit data stored in an identified file within said second random access memory via said first input/output port to the first computer, and
   means responsive to a third command for controlling the second computer independent of whether said first computer is performing other tasks or is deenergized to
      respond to communication initiated by the outside data source,
      receive data via said second input/output port from the outside data source, and
      store said received data in a file within said second random access memory.

10. The computer system of claim 9 including programs comprising operating systems for the first and second computers stored in the read only memories of the first and second computers respectively, and applications programs for the second computer stored in said secondary mass memory of the first computer to be entered into the random access memory of the first and second computers under the control of the first computer.

11. The computer system of claim 9 wherein said first computer includes expansion slots to receive printer circuit boards having edge connectors to be interconnected to said first address and data bus of said first computer and said second computer is formed on a printed circuit board having an edge connector, and said first input/output port of the second computer is connected to said edge connector to achieve the electrical interconnection between said first input/output port of the second computer and the first address and data bus of the first computer.

12. The computer system of claim 11 further including end connectors of the printed circuit board supporting said second computer, said end connectors being connected to the second input/output port of said second computer.

13. The communications processor of claim 9 wherein:
said second computer immediately initiates communication and transmits data stored in said file upon receipt of said first command.

14. The communications processor of claim 9 wherein:
said second computer initiates communication and transmits data stored in said file at a commanded later time upon receipt of said first command.

15. The communications processor of claim 9 wherein:
said second computer refuses communication initiated by the outside data source and records an attempted communication if the length of received data is greater than the available space within said second random access memory when in said standby mode.

16. A communications processor for use with a personal computer having address and data busses connected to a female connector to receive a male edge connector formed on said communications processor comprising:
- a rectangular printed circuit board having said male edge connector formed on one of its long edges for mating with the female connector of the personal computer;
- a line cord having a first end for connection to an AC electric power line and a second end connected to said printed circuit board;
- electronic components supported on the printed circuit board and interconnected with one another by conductors formed on the printed circuit board to form a microcomputer, said components including an address/data bus, a microprocessor connected to said address/data bus, a random access memory connected to said address/data bus, a read only memory connected to said address/data bus, a line-powered power supply connected to said line cord, said microprocessor, said random access memory and said read only memory for powering said microcomputer via the AC electric power line and a battery operated power supply connected to said microprocessor, said random access memory, said read only memory and said line-powered supply for powering said microcomputer upon failure of the AC electric power line;
- a second connector formed on a short edge of the printed circuit board;
- electronic components forming two I/O ports supported on the printed circuit board and interconnected by conductors formed on the printed circuit board, the first of the I/O ports being connected to said male edge connector and to said address/data bus, and the second of the I/O ports being connected to said address/data bus and to said second connector; and
- program means to enable the communication processor
  - to respond to a first command from the personal computer to
    - receive data via said first I/O port from said male edge connector, and
    - store said received data in a file within said random access memory, and
    - transmit data stored in said file within said random access memory via said second I/O port to said second connector independent of whether the personal computer is performing other tasks or is de-energized,
  - to respond to a second command from the personal computer to transmit data in an identified file within said random access memory via said first I/O port to said male edge connector, and
  - to respond to a third command from the personal computer to enter a standby mode independent of whether the personal computer is performing other tasks or is de-energized to
    - respond to communication received via said second I/O port from said second connector,
    - receive data via said second I/O port from said second connector; and
    - store said received data in a file within said random access memory.

17. The communications processor of claim 16 wherein:
said communications processor immediately initiates communication and transmits data stored in said file in response to said first command.

18. The communications processor of claim 16 wherein:
said communications processor initiates communication and transmits data stored in said file at a commanded later time in response to said first command.

19. The communications processor of claim 16 wherein:
said communications processor refuses communication initiated via said second I/O port from said second connector and records an attempted communication if the length of received data is greater than the available space within said random access memory when in said standby mode.

* * * * *

UNITED STATES PATENT AND TRADEMARK OFFICE
CERTIFICATE OF CORRECTION

PATENT NO. : 4,974,192

DATED : November 27, 1990

INVENTOR(S) : Face et al.

It is certified that error appears in the above-identified patent and that said Letters Patent is hereby corrected as shown below:

Column 1, line 35, "slot" should be --slots--;

Column 1, line 37, "slot" should be --slots--;

Column 2, line 18, "semi-conductor" should be --semiconductor--;

Column 2, line 30, "the" (First one) should be --a--;

Column 3, line 55, "as" should be --is--;

Column 4, line 9, "the" should be --an--;

Column 6, line 52, "program" should be --programs--;

Column 6, line 55, "adapted" should be deleted;

Column 8, line 16, "deenergized" should be --de-energized--.

Signed and Sealed this

Thirtieth Day of June, 1992

*Attest:*

DOUGLAS B. COMER

*Attesting Officer*     *Acting Commissioner of Patents and Trademarks*